US006636425B2

(12) United States Patent (10) Patent No.: US 6,636,425 B2
Shim (45) Date of Patent: Oct. 21, 2003

(54) CASE FOR COMPUTER BODY

(75) Inventor: Woo-Jung Shim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 115 days.

(21) Appl. No.: 09/810,535

(22) Filed: Mar. 19, 2001

(65) Prior Publication Data

US 2002/0030968 A1 Mar. 14, 2002

(30) Foreign Application Priority Data

Sep. 9, 2000 (KR) .......................................... 2000-53692

(51) Int. Cl.$^7$ ................................................. G06F 1/16
(52) U.S. Cl. ...................................... 361/724; 361/726
(58) Field of Search .................................. 361/724–727

(56) References Cited

U.S. PATENT DOCUMENTS

| | | | | |
|---|---|---|---|---|
| 4,979,636 A | | 12/1990 | Daly | |
| 5,156,433 A | * | 10/1992 | Decker | 296/97.7 |
| 5,815,379 A | * | 9/1998 | Mundt | 361/683 |
| 6,000,767 A | | 12/1999 | Liu et al. | |
| 6,102,500 A | | 8/2000 | Chen | |
| 6,130,822 A | | 10/2000 | Della Fiora et al. | |
| 6,297,948 B1 | * | 10/2001 | Buican et al. | 361/683 |

\* cited by examiner

*Primary Examiner*—Darren Schuberg
*Assistant Examiner*—Yean Hsi Chang
(74) *Attorney, Agent, or Firm*—Robert E. Bushnell, Esq.

(57) ABSTRACT

A case for a computer body may be constructed with a first case portion and a second case portion, forming a space by combination thereof along a first and a second coupling lines; a first coupling part for coupling the first and second cases along the first coupling line; a latch unit having a latch body slidable relative to the first case along the second coupling line, and at least one latch extended from the latch body along the second coupling line to be protruded toward the second case; and an engagement member provided in the second case, being engaged into or disengaged from the latch according to sliding of the latch unit. With this configuration, it is easy to assemble and disassemble the case and the computer body.

18 Claims, 7 Drawing Sheets

CASE FOR COMPUTER BODY

CLAIM FOR PRIORITY

This application makes reference to, incorporates the same herein, and claims all benefits accruing under 35 U.S.C. §119 arising from an application for a Case For Computer Body earlier filed in the Korean Industrial Property Office on Sep. 9, 2000, and there duly assigned Serial No. 2000-53692.

FIELD OF INVENTION

The present invention relates to the construction and assembly of computer housings generally, and more particularly, to cases for enclosing the bodies of computers.

DESCRIPTION OF RELATED ART

Conventional computer system includes a computer body, a visual monitor and input devices such as keyboards and mice. Most of these components are installed within the computer body, and a body case covering the computer body defines the outer appearance of the computer system. A plurality of holes are provided in the rear corners of the computer body, for coupling the main body with the body case. A plurality of holes corresponding to the holes are also provided in the body case.

During assembly, the body case and the computer body are attached to each other by means of screws after positioning the holes and to be opposite to each other.

In order to repair the computer body or install new hardware in the computer body, the computer body and the body case of the conventional computer have to be disassembled. For disassembling the computer body and the body case, separate tools or devices for removing the screws are needed, which may cause inconvenience or trouble to users. Furthermore, some of the screws may be lost in the process of assembling or disassembling the computer body and the body case.

SUMMARY OF THE INVENTION

It is therefore an object of the present invention to provide a body case for a computer in which disassembly of the body case and the computer body is easily performed.

Another object of the invention is to provide a body case for a computer which may be assembled and disassembled without special tools.

Yet another object of the invention is to provide a body case for a computer which does not require screws for assembly and disassembly.

These and other objects of the present invention may be achieved by a provision of a case for a computer body, which includes two case portions, forming a space by combination of the two case portions along two coupling lines; a first coupling part for coupling the two case portions along one of the coupling lines; a latch unit having a latch body slidable relative to the first case portion along the other coupling line, and at least one latch extending from the latch body along the second coupling line to protrude toward the second case portion; and an engagement member provided in the second case portion, being engaged into or disengaged from the latch according to sliding of the latch unit.

Effectively, the latch body includes a guide part having at least two elongated holes formed in the latch body along the movement of the latch body, and a guide screw engaged with the first case portion through the elongated holes.

For convenience, a drawing handle is provided at one end of the latch body transversely relative to movement of the latch body.

Effectively, the engagement member has one end connected to the inner wall of the second case and the other having an engagement hook engaged with the latch and elastically deformable transversely relative to the second coupling line, and a slanted guide is formed adjacent to the engagement hook of the engagement member, contacting the latch when the engagement member moves transversely relative to the second coupling line.

The first coupling part may include a first hook extending from an inner wall face of the first case portion along the first coupling line for coupling to the second case portion, and a first catch provided in the inner wall face of the first case adjacent to the first coupling line, for holding the first hook.

Effectively, the first coupling part includes at least a second hook extended from an inner wall face of the second case along the first coupling line; and at least a second catch provided in the inner wall face of the first case adjacent to the first coupling line, for holding the second hook.

The first coupling part may include a hinge pin accommodating part formed in either of the first or second cases, and a hinge pin formed at one of the first and second cases, for being accommodated in the hinge pin accommodating part.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 7:
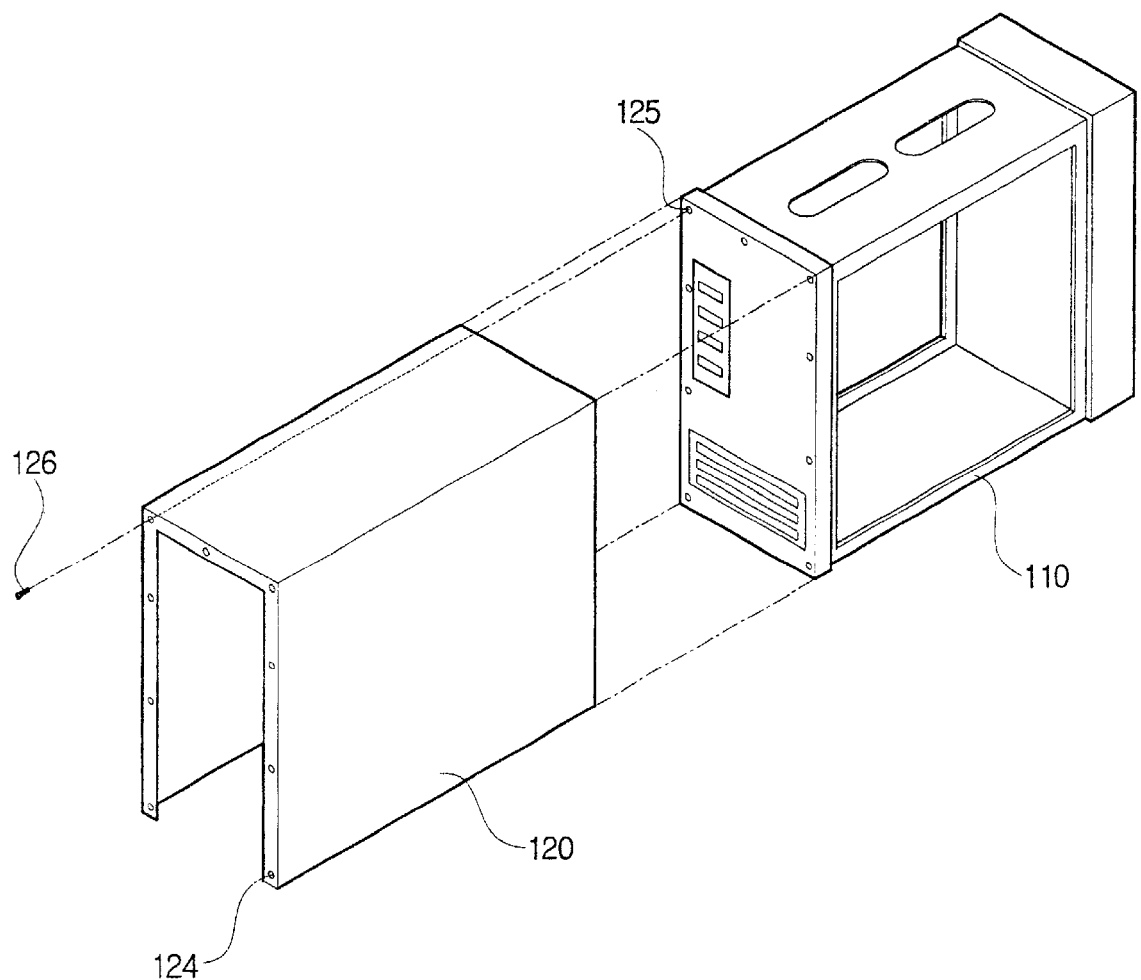
FIG. 7 is an exploded perspective view of a conventional case and a computer body.

Turning now to the drawings, an exemplar of a conventional computer system discussed above will be described with reference to FIG. 7. Typically, conventional computer systems include a computer body 110, a visual monitor (not shown) and an input device. A plurality of components (not shown) are installed within the computer body 110, and a body case 120 covering the computer body 110 defines the outer appearance of the computer system. A plurality of holes 125 are provided in the rear corners of the computer body 110, for coupling the main body 100 with the body case 120. A plurality of holes 124 corresponding to the holes 125 are also provided in the body case 120.

During assembly, the body case 120 and the computer body 110 are attached to each other by means of screws 126 after positioning the holes 124 and 125 to be opposite to each other.

In order to repair the computer body 110 or install new hardware in the computer body, the computer body 110 and the body case 120 of the conventional computer have to be disassembled. For disassembling the computer body 110 and the body case 120, separate tools or devices for removing the screws 126 are needed, which may cause inconvenience or trouble to users. Further, some of the screws 126 may be lost in the process of assembling or disassembling the computer body 110 and the body case 120.

Figure 1:
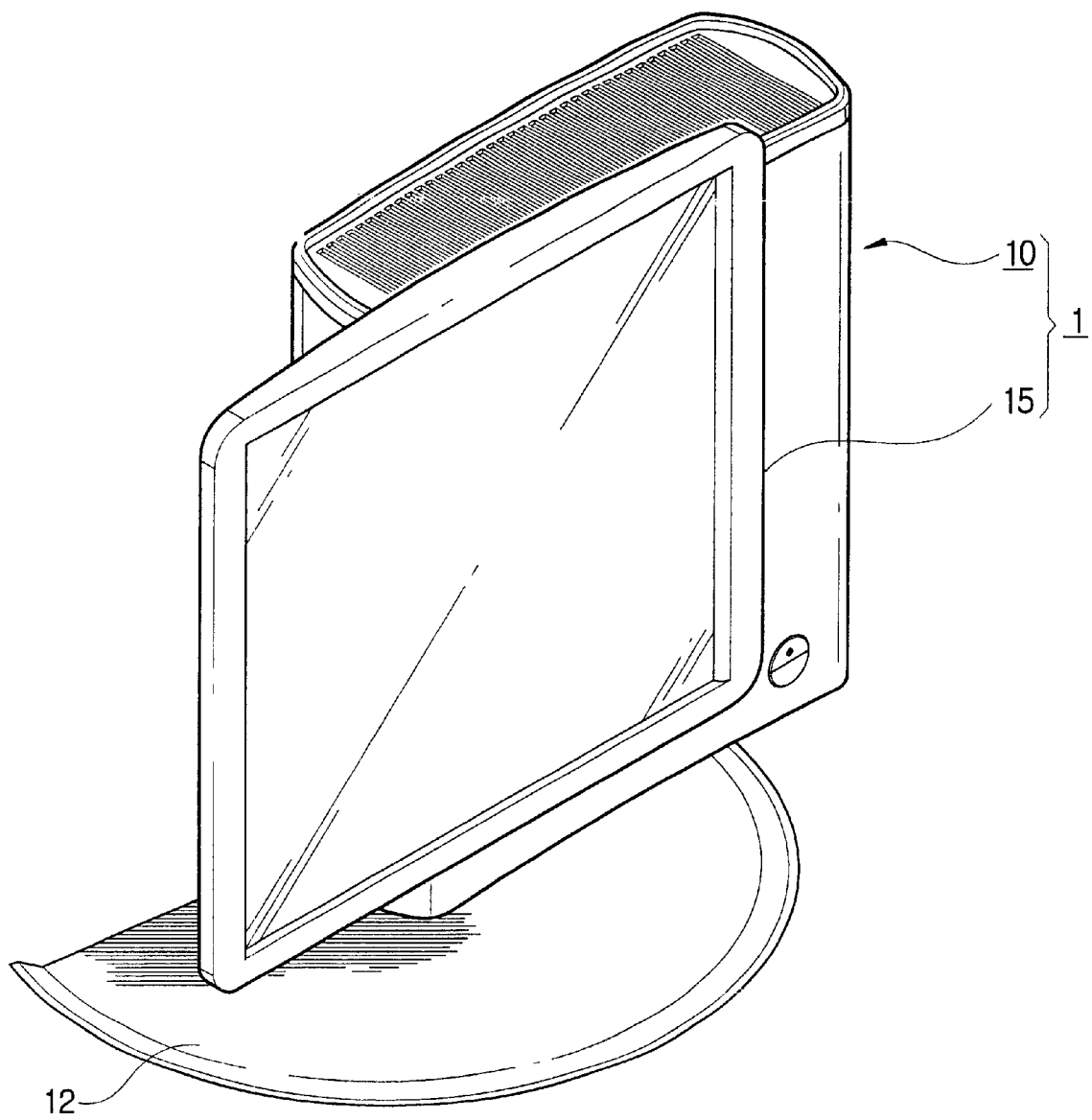
FIG. 1 is a perspective view of a computer system employing a case for a computer body constructed in accordance with the principles of the present invention.

The present invention will now be described with reference to the drawings. Referring to FIG. 1, a computer system 1 employing a case for a computer body according to one embodiment of the present invention, may be constructed with a computer body 10 in which a plurality of components are installed, a base plate 12 supporting the computer body 10, a video monitor 15 combined with the computer body 10 for displaying pictures, and an input device (not shown) for inputting information into the computer body 10.

Within the computer body 10 are a motherboard (not shown) at which a variety of cards including a graphic card, as well as a central processing unit (CPU) and a random access memory (RAM), etc. are installed, and a hard disk drive, etc. A body case 20 covers the computer body 10 to define an outer appearance of the computer body 10.

Figure 2:
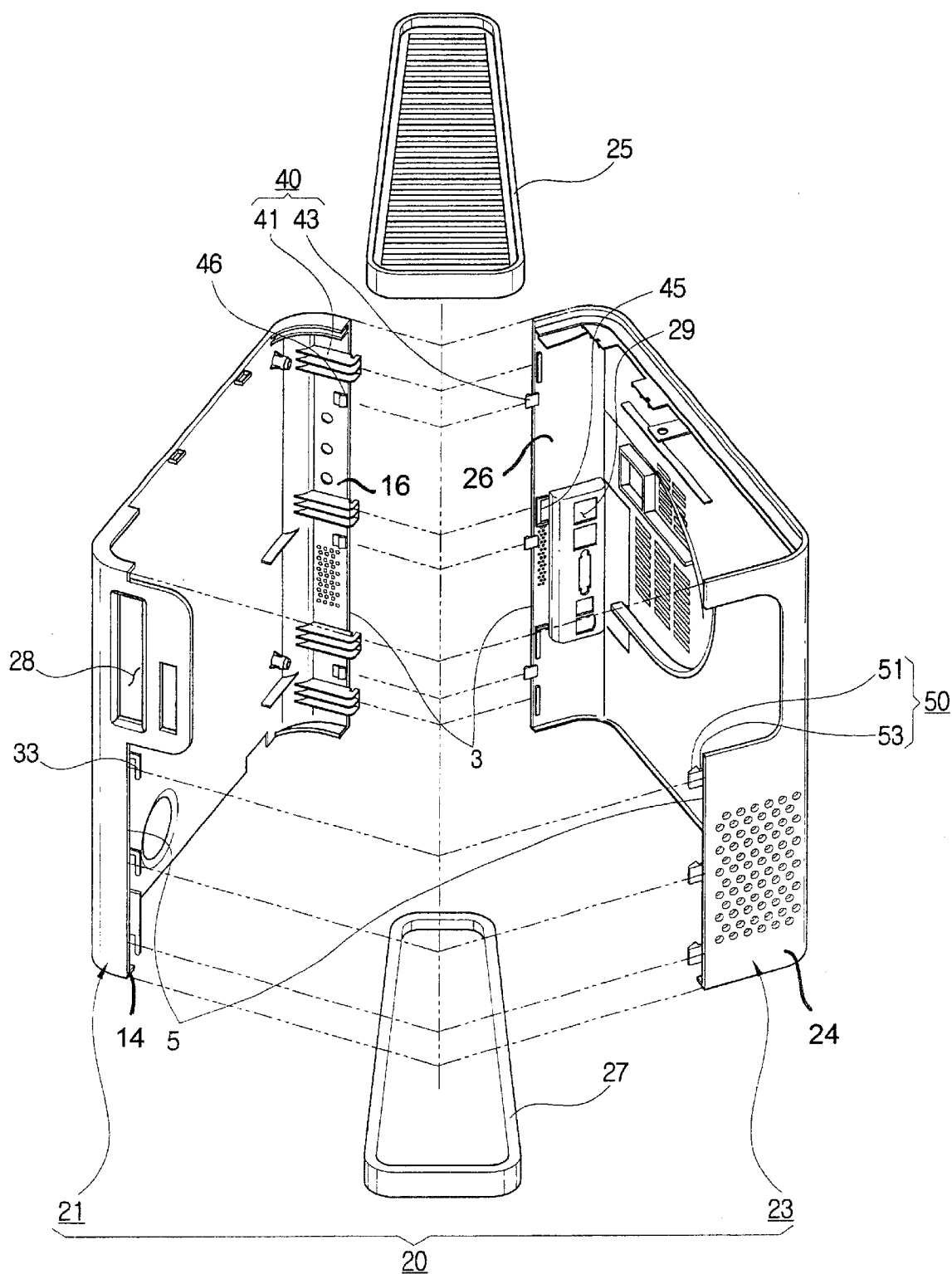
FIG. 2 is an exploded perspective view of the case shown by FIG. 1.

Referring to FIG. 2 which is an exploded perspective view of the body case 20 of FIG. 1, FIG. 3 which is an enlarged perspective view of one case portion according to the present invention, and FIG. 4 which is an enlarged perspective view of the other case portion according to the present invention, the body case 20 will be described in detail.

The body case 20, as depicted in FIG. 2, includes a case portion 21 and a case portion 23, both approximately "U"-shaped. That is, case portion 21 has opposite sides 14 and 16 which are parallel to each other, and case portion 23 has opposite sides 24 and 26 which are parallel to each other. The "U" shape may be seen in FIG. 2 in the sides at right angles to opposite sides 14 and 16 in case portion 21, and in the sides at right angles to opposite sides 24 and 26 in case portion 23. In addition, body case 20 has an upper cover 25 covering the upper parts of case portions 21 and 23 and a lower cover 27 covering the lower parts of case portions 21 and 23.

A space for receiving the components in the computer body 10 is created by coupling the case portion 21 and the case portion 23. Externally, the side edges of case portions 21 and 23 coupled to each other create coupling line 3 at the rear side of the computer body as shown in FIG. 2, and coupling line 5 at the front side. On the planar surfaces of case portions 21 and 23 are formed a plurality of engagement holes 28 and port openings 29. The body case 20 has a coupling part 40 and a coupling part 70 coupling the case portions 21 and 23 along coupling lines 3 and 5, respectively.

Figure 3:
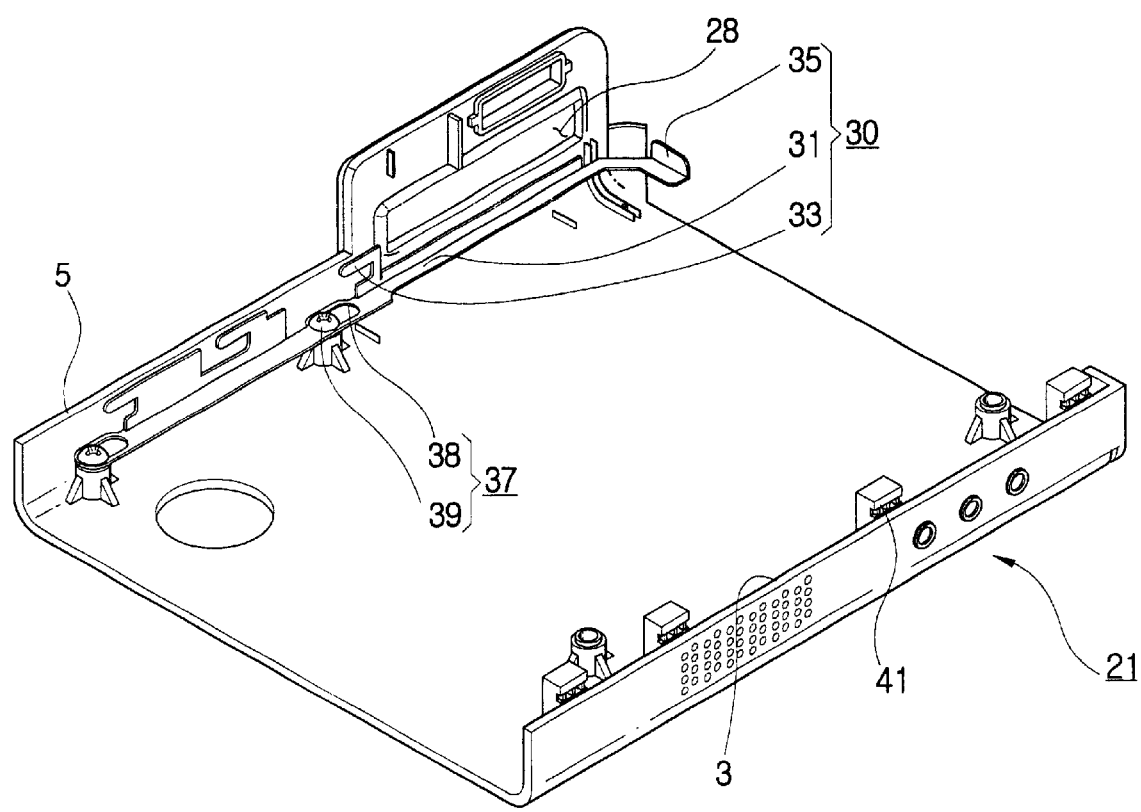
FIG. 3 is an enlarged perspective view of a case portion constructed in accordance with the principles of the present invention.
Figure 4:
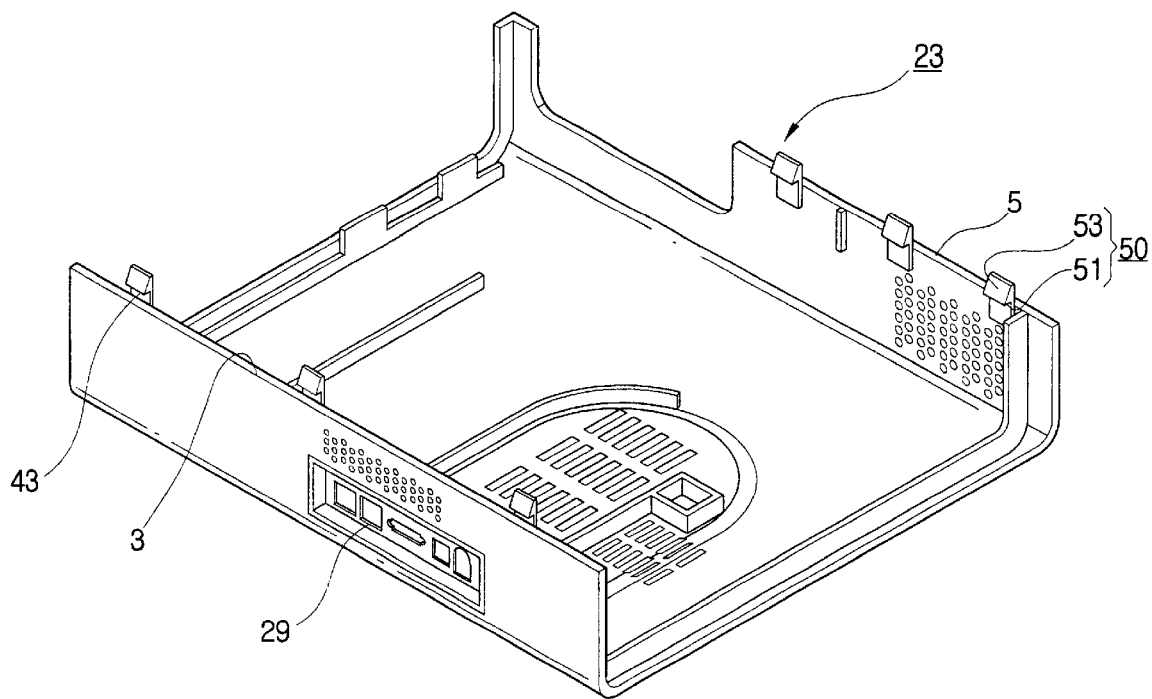
FIG. 4 is an enlarged perspective view of a case portion constructed in accordance with the principles of the present invention.

Coupling part 40, as illustrated in FIGS. 2, 3 and 4, includes a plurality of hooks 41 extending from the inner wall face of case portion 21 along coupling line 3, that protrude toward case portion 23 during coupling. A plurality of catches 45 corresponding with hooks 41 are formed in the inner wall face of case portion 23. A catch accommodating part is provided in hook 41 so as to allow the hook 41 to be engaged with catch 45 and to maintain the engagement. By the engagement of the hook 41 with catch 45 in response to the accommodation of catch 45 in the catch accommodating part, case portions 21 and 23 are coupled to each other.

Coupling part 40 further includes a plurality of hooks 43, extending from the inner wall face of case portion 23 along coupling line 3, that protrude toward case portion 21. A plurality of catches 46 are formed in the inner face wall of the case portion 21 toward case portion 23. As shown in FIG. 2, there is provided a hook part by which hook 43 is allowed to be coupled with catch 46. A user can couple case portion 21 to case portion 23 by engaging the hook part of hook 43 with a protrusion formed in catch 46.

With this configuration, hooks 41 and 43 are respectively engaged with catches 45 and 46 respectively formed in case portions 21 and 23. When engaged, either of the case portions 21 or 23 is allowed to rotate relative to the other around coupling line 3, but is not allowed to deviate from the first coupling line 3. Hooks 43 engage catches 46 initially during the coupling of the case portions along coupling line 3, and are the last to disengage upon uncoupling. The engagement of hooks 41 with catches 45 maintains the coupling of the case portions 21 and 23 along coupling line 3.

Coupling part 70 includes a latch unit 30 combined with case portion 21 along coupling line 5, for opening and closing the case portions 21 and 23, and an engagement member 50 provided in case portion 23 which may be engaged with or disengaged from the latch unit 30.

The latch unit 30 includes a latch body 31 provided at a side of case portion 21, at least one latch 33 formed on the latch body 31 to protrude toward case portion 23, and a drawing handle 35 formed at one edge of the latch body 31.

The latch body 31 includes a guide part 37 coupled to case portion 21 in an inner wall edge of case portion 21 adjacent to the second coupling line 5, for guiding the latch body so as to slidably move parallel to coupling line 5. The guide part 37 includes at least two elongated holes 38 formed in the latch body 31 in the direction of the movement of the latch body 31, that is, parallel to the long direction of the latch body, and at least two guide screws 39 engaged with case portion 21 through the elongated holes 38, to thereby define the movement range of the latch body 31.

The latch 33 is engaged with a detent 51 on the engagement member 50 provided in case portion 23, and the drawing handle 35 is in the form of an extension of the latch body 31 transverse relative to the movement of the latch body.

The engagement member 50 is provided in case portion 23 along coupling line 5, and has detent 51 engaged with the latch 33 of case portion 21 and slanted guide 53 which faces inward, that is, toward opposite side 26 of case portion 23. Engagement member 50 contacts the latch 33 when case portion 23 moves transversely relative to coupling line 5, that is, when case portion 23 moves toward case portion 21. The engagement member 50 can be elastically deformed in the direction perpendicular to the side of the case portion where engagement member 50 is attached, allowing case portion 21 and case portion 23 to be easily coupled to each other by the slanted guide 53.

According to the present invention, the computer body 10 and the body case 20 can be assembled and disassembled in the following process. The description of the process will refer to FIG. 5, which shows a view of a coupling state of the latch unit 30 and the engagement 50 member according to the present invention.

Figure 5:
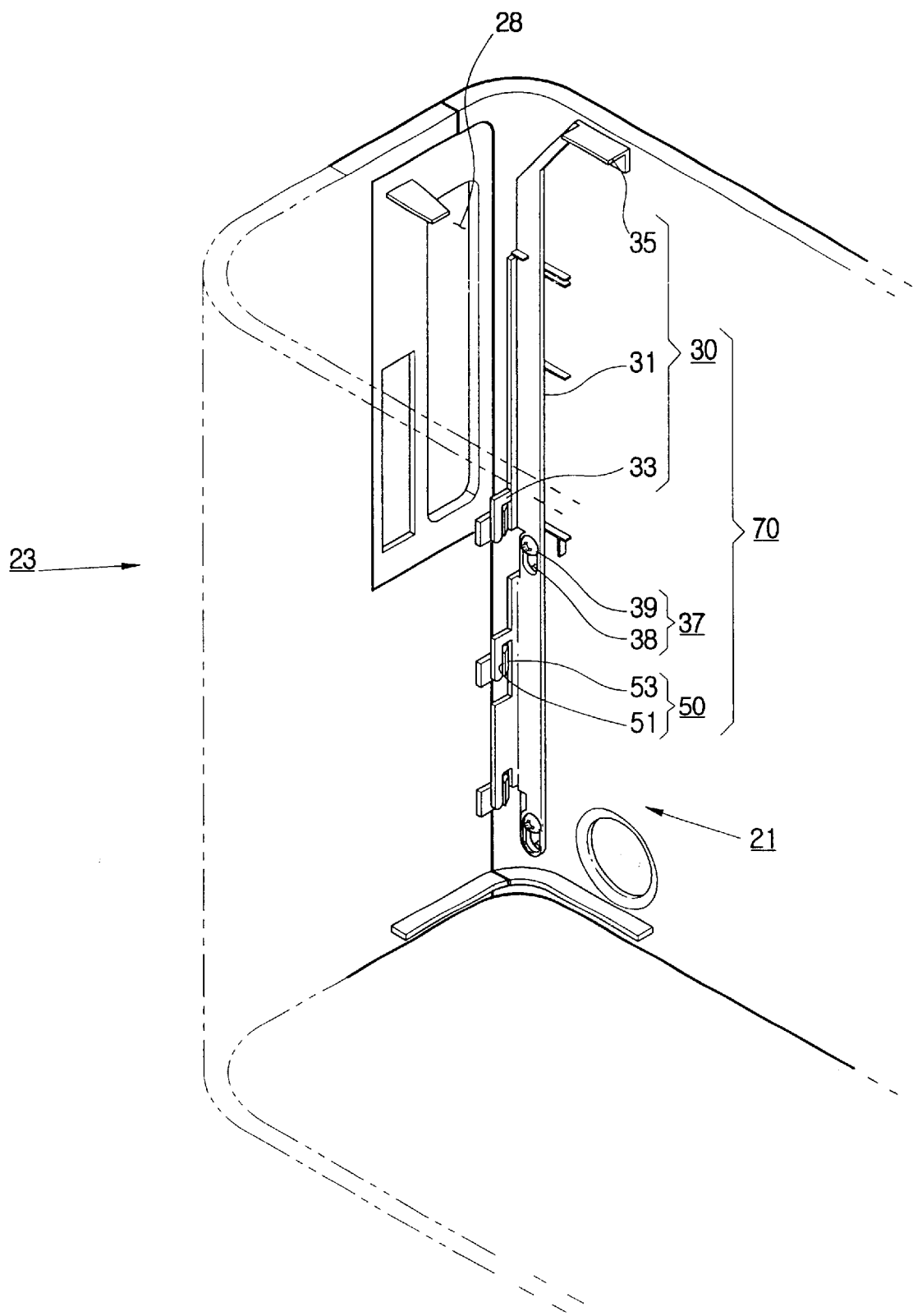
FIG. 5 is a view showing a coupling state of a latch unit and an engagement member constructed in accordance with the principles of the present invention.

In order to repair a computer or install a new hardware in the computer, a user first removes the upper cover 25 from the combined case portions 21 and 23. FIG. 5 illustrates the upper cover 25 removed, and the latch body 31, which can slidably move along the second coupling line 5, is shown at the upper part of the drawing. The drawing handle 35 of the shown latch body 31 is drawn upward, and then the latch unit 30 is definitely moved by a predetermined distance determined by the elongated hole 38 and the guide screw 39 of the guide part 37. The latch 33 of the latch body 31 is disengaged from the engagement body 51 of the engagement member 50. The case portions 21 and 23 are respectively pulled in the opposite direction along the front coupling line 5. In response, hooks 41 and 43, formed in the edges of case portions 21 and 23 adjacent to the coupling line 3, are disengaged from catches 45 and 46; thus, case portions 21 and 23 are disassembled. To assemble case portions 21 and 23, the above-described process is conducted in reverse.

Figure 6:
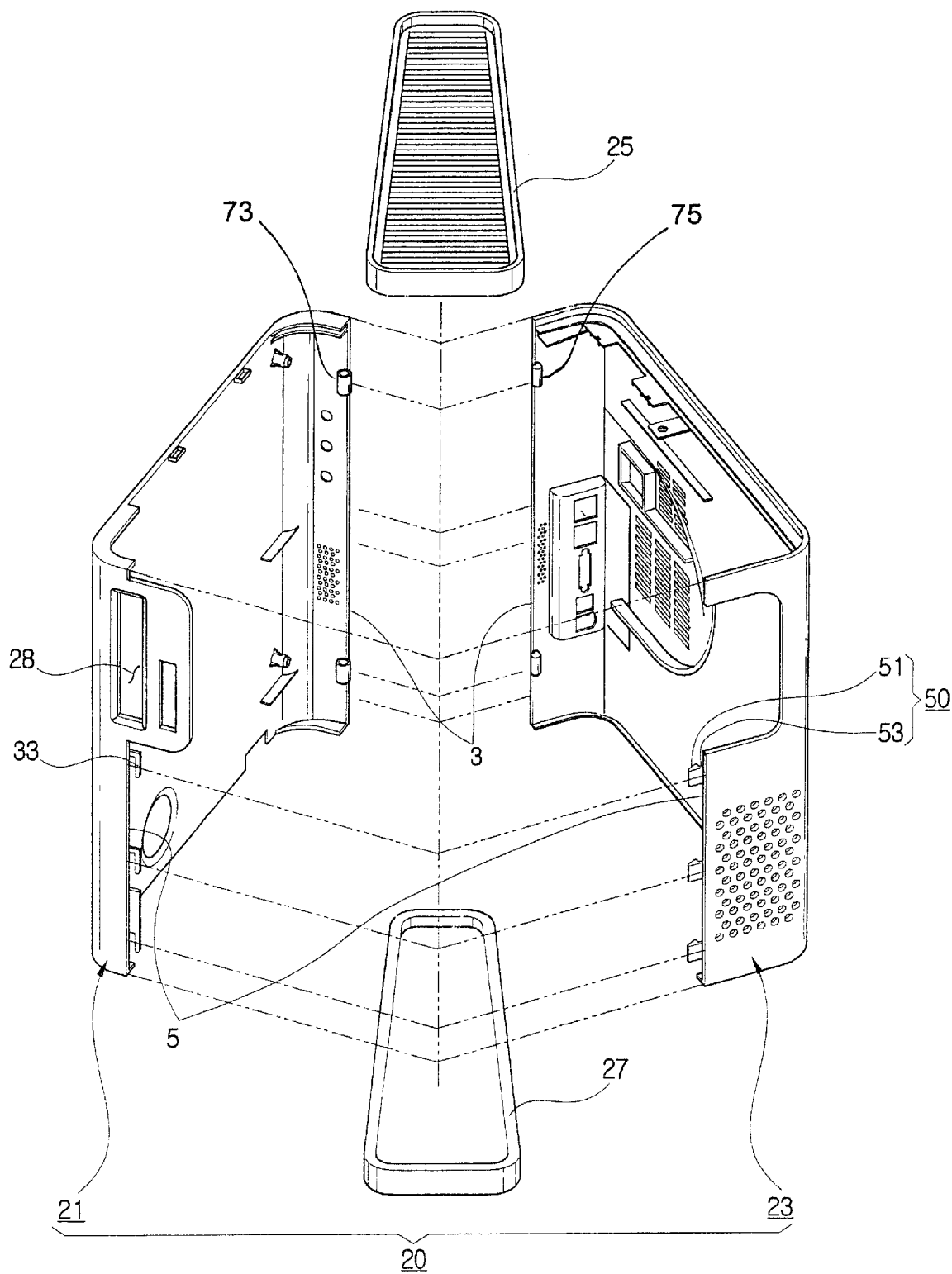
FIG. 6 is a perspective view of a computer system employing a case for a computer body constructed in accordance with the principles of the present invention.

In the above-described embodiment, coupling part 40 provided in case portions 21 and 23 has been described as including hooks 41 and 43 respectively formed on the edges of case portions 21 and 23 adjacent to the first coupling line 3, and as including catches 45. In another embodiment of the invention however, the hooks and catches may be replaced with a hinge pin accommodating part 73 formed at one of case portions 21 and 23, and a hinge pin 75 formed at the other of the case portions, for being accommodated in the hinge pin 75 accommodating part 73. An embodiment employing a hinge pin 75 and hinge pin accommodating part 73 is seen in FIG. 6.

In another embodiment, coupling part 40 may include a latch unit 30 and an engagement member 50 of the general structure described in the second coupling part. To open the computer case, a user first disengages the latch unit 30 of the coupling part on one coupling line, and then disengages the coupling unit along the other coupling line, and the object and effect of the present invention may be achieved.

With this configuration, assembling and disassembling of the computer body and the case of the body is simply constructed and easily manufactured and used, with the latch unit coupled to one case portion, and the engagement member engaged into and disengaged from the latch unit according to the sliding movement of the latch unit provided in the other case portion. This configuration further provides a case for a computer body without screws and screw holes connecting the case portions.

In consequence, the body case having the latch unit and the engagement member provided in the case according to the present invention is advantageous with respect to the assembly and disassembly of the computer body and the body case.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A case for a computer, comprising:
   a first case portion having a first side and a second side;
   a second case portion having a first side and a second side, said second case portion shaped such that the first side of the second case portion contacts the first side of the first case portion along a first coupling line, and such that the second side of the second case portion contacts the second side of the first case portion along a second coupling line;
   a coupling part formed in the first side of the first case portion and the first side of the second case portion for coupling the first case portion and second case portion along the first coupling line;
   an upper cover covering the upper parts of said first and second case portions;
   a lower cover covering the lower parts of said first and second case portions;
   a latch unit in the first case portion, said latch unit comprising;
      a latch body mounted in the first case portion near the second side of the first case portion, said latch body being mounted to be slidable parallel to the second coupling line; and
      a latch extending from the latch body along the second side of the first case portion; and
   an engagement member extending from the second side of the second case portion, for engaging said latch, whereby said first case portion, said second case portion, said upper cover and said lower cover completely surround said computer.

2. The computer case of claim 1, further comprising:
   said latch body having an elongated shape in a direction parallel to the second coupling line and having at least two holes elongated in the direction parallel to the second coupling line; and
   said latch body being mounted in the first case portion by guide screws, each guide screw passing through one of the holes of the latch body and into said first case portion.

3. The computer case of claim 1, further comprising:
   said latch body having an elongated shape in a direction parallel to the second coupling line and having an end in said direction;
   said latch body further comprising a handle formed at said end.

4. The computer case of claim 1, said engagement member being connected to an inner wall of said second case portion, said engagement member being elastically deformable along in a direction perpendicular to the second side of the second case portion, and said engagement member further comprising a detent for engaging said latch.

5. The computer case of claim 4, said engagement member further comprising:
   a slanted guide facing toward the first side of the second case portion.

6. The computer case of claim 1, said coupling part further comprising:
   a first hook extending from an inner wall of said first side of said first case portion along the first coupling line; and
   a first catch located on the inner wall of said first side of said second case portion, for engaging said first hook.

7. The computer case of claim 6, further comprising:
   a second hook extending from the inner wall of said first side of said second case portion along the first coupling line; and
   a second catch located on the inner wall of said first side of said first case portion, for engaging said second hook.

8. The computer case of claim 7, further comprising:
   said first hook being of different shape than said second hook and said first catch being of different shape than said second catch.

9. The computer case of claim 8, further comprising:
- a third hook extending from the inner wall of said first side of said first case portion along the first coupling line, said third hook being of the same shape as said first hook; and
- a third catch located on the inner wall of said first side of said second case portion, said third catch being of the same shape as said first catch.

10. The computer case of claim 6, further comprising:
- a second hook extending from the inner wall of said first side of said first case portion along the first coupling line, said second hook being of the same shape as said first hook; and
- a second catch located on the inner wall of said first side of said second case portion, said second catch being of the same shape as said first catch.

11. The computer case of claim 1, said coupling part further comprising:
- a first hook extending from an inner wall of said first side of said second case portion along the first coupling line; and
- a first catch located on the inner wall of said first side of said first case portion, for engaging said first hook.

12. The computer case of claim 11, further comprising:
- a second hook extending from the inner wall of said first side of said second case portion along the first coupling line, said second hook being of the same shape as said first hook; and
- a second catch located on the inner wall of said first side of said first case portion, said second catch being of the same shape as said first catch.

13. The computer case of claim 1, said coupling part further comprising:
- a hinge pin formed in one of said first and second case portion; and
- a hinge pin accommodating part formed in the other of said first and second case portion, for accommodating said hinge pin.

14. The computer case of claim 1, said coupling part further comprising:
- a hinge pin formed in one of said first and second case portion; and
- a hinge pin accommodating part formed in the other of said first and second case portion, for accommodating said hinge pin, wherein said hinge pin and hinge pin accommodating part are easily assembled or disassembled without special tools or screws.

15. The computer case of claim 1, said coupling part further comprising:
- a plurality of said latches and a plurality of said engagement members of the some form as said latch and said engagement member, respectively.

16. The computer case of claim 1, further comprising:
- said first case portion having third and fourth sides at right angles to said first and second sides, said third and fourth sides of the first case portion each being U-shaped;
- said second case portion having third and fourth sides at right angles to said first and second sides, said third and fourth sides of the second case portion each being U-shaped; and further comprising:
  - an upper cover mountable to the third sides of the first case portion and second case portion; and
  - a lower cover mountable to the fourth sides of the first case portion and second case to portion.

17. A method of easily disassembling and assembling a computer housing completely surrounding a computer chassis, comprising:
- providing a first case portion and a second case portion completely surrounding said computer chassis, coupling said first case portion and said second case portion on a first coupling line and a second coupling line wherein said first and second coupling lines are essentially opposite to each other;
- providing an upper cover covering the upper parts of said first and second case portions;
- providing a lower cover covering the lower parts of said first and second case portions; and
- accomplishing said coupling with an easily decoupled coupling assembly along one of said first and said second coupling lines and providing an easily releasable latching assembly along said other of said first and said second coupling lines, and mounting said easily decoupled coupling assembly on said first and second case portions along one of said first and second coupling lines, and mounting said releasable latching assembly on said first and said second case portions along said other of said first and said second coupling lines.

18. The method of claim 17, comprising:
- providing at least two holes elongated in the direction parallel to said other of said first and said second coupling lines, in a latch body of said releasable latching assembly, and mounting said latch body on one of said first and said second case portions by guide screws, passing each guide screw through one of the elongated holes of the latch body and into said one of said first and said second case portions.

* * * * *